(12) United States Patent
Matumoto et al.

(10) Patent No.: US 7,961,454 B2
(45) Date of Patent: Jun. 14, 2011

(54) MULTI-LAYERED SOLID ELECTROLYTIC CAPACITOR AND METHOD OF MANUFACTURING SAME

(75) Inventors: Takayuki Matumoto, Takeo (JP); Tetsuyuki Sakuda, Imari (JP)

(73) Assignees: Sanyo Electric Co., Ltd., Moriguchi-shi (JP); Saga Sanyo Industries Co., Ltd., Saga (JP)

( * ) Notice: Subject to any disclaimer, the term of this patent is extended or adjusted under 35 U.S.C. 154(b) by 169 days.

(21) Appl. No.: 11/914,914

(22) PCT Filed: Dec. 26, 2005

(86) PCT No.: PCT/JP2005/023732
§ 371 (c)(1),
(2), (4) Date: Nov. 19, 2007

(87) PCT Pub. No.: WO2006/123451
PCT Pub. Date: Nov. 23, 2006

(65) Prior Publication Data
US 2009/0080144 A1 Mar. 26, 2009

(30) Foreign Application Priority Data

May 18, 2005 (JP) ................................ 2005-145692
Nov. 25, 2005 (JP) ................................ 2005-339734

(51) Int. Cl.
*H01G 9/04* (2006.01)
*H01G 9/145* (2006.01)
*H01G 4/228* (2006.01)
*H01G 9/00* (2006.01)
*H01G 5/38* (2006.01)

(52) U.S. Cl. ...................... 361/528; 361/540; 361/541

(58) Field of Classification Search .............. 361/528, 361/532, 529, 541, 523, 540, 538
See application file for complete search history.

(56) References Cited

U.S. PATENT DOCUMENTS 125,543 A    4/1872   Comstrock
(Continued)

FOREIGN PATENT DOCUMENTS

CN    1272947 A    11/2000
(Continued)

OTHER PUBLICATIONS

International Search Report of PCT/JP2005/023732, date of mailing Mar. 20, 2006.
(Continued)

*Primary Examiner* — Eric Thomas
*Assistant Examiner* — David M Sinclair
(74) *Attorney, Agent, or Firm* — Westerman, Hattori, Daniels & Adrian, LLP

(57) ABSTRACT

A multi-layered solid electrolytic capacitor and a method of manufacturing the capacitor that improve the product yield drastically by preventing increases in leakage current and defects due to short circuits without increasing manufacturing cost or capacitor size. A multi-layered solid electrolytic capacitor includes: a plurality of capacitor elements, each including an aluminum foil having an anode portion and a cathode portion having a dielectric oxide film and a cathode layer formed in succession on a surface of the aluminum foil, wherein the plurality of capacitor elements are stacked on top of one another, the anode portions of adjacent capacitor elements are welded each other, and the anode portion of one of the outermost capacitor elements is weld-secured to an anode terminal, the multi-layered solid electrolytic capacitor having a first stress alleviating groove and a second stress alleviating groove formed in at least one of weld surfaces of the anode portion.

11 Claims, 13 Drawing Sheets

U.S. PATENT DOCUMENTS

| | | | |
|---|---|---|---|
| 4,940,496 A * | 7/1990 | Matsumoto et al. | 136/256 |
| 6,249,424 B1 | 6/2001 | Nitoh et al. | |
| 6,989,587 B2 * | 1/2006 | Ito et al. | 257/678 |
| 7,359,181 B2 * | 4/2008 | Kuriyama | 361/540 |
| 2002/0015277 A1 * | 2/2002 | Nitoh et al. | 361/523 |
| 2006/0162764 A1 * | 7/2006 | Toyama | 136/252 |

FOREIGN PATENT DOCUMENTS

| | | | | |
|---|---|---|---|---|
| JP | 55115268 A | * | 9/1980 | |
| JP | 59056752 A | * | 4/1984 | |
| JP | 59076457 A | * | 5/1984 | |
| JP | 61141165 A | * | 6/1986 | |
| JP | 62162323 A | * | 7/1987 | |
| JP | 63-151032 A | | 6/1988 | |
| JP | 63151032 A | * | 6/1988 | |
| JP | 63-166254 A | | 7/1988 | |
| JP | 63166254 A | * | 7/1988 | |
| JP | 01017458 A | * | 1/1989 | |
| JP | 04127605 A | * | 4/1992 | |
| JP | 05090094 A | * | 4/1993 | |
| JP | 07153889 A | * | 6/1995 | |
| JP | 10144573 A | * | 5/1998 | |
| JP | 11-135367 A | | 5/1999 | |
| JP | 2000340446 A | * | 12/2000 | |
| JP | 2003-77768 A | | 3/2003 | |
| JP | 2003-92144 A | | 3/2003 | |
| JP | 2004-087893 A | | 3/2004 | |
| JP | 2004-221534 A | | 8/2004 | |

OTHER PUBLICATIONS

Japanese Office Action dated Jun. 29, 2010, issued in corresponding Japanese Patent Application No. 2007-516203.

Chinese Office Action dated Mar. 23, 2010, issued in corresponding Chinese Patent Application No. 200580049834.0.

* cited by examiner

MULTI-LAYERED SOLID ELECTROLYTIC CAPACITOR AND METHOD OF MANUFACTURING SAME

TECHNICAL FIELD

The present invention relates to multi-layered solid electrolytic capacitors and methods of manufacturing the same, and particularly to a multi-layered solid electrolytic capacitor that can improve the product yield and a method of manufacturing the same.

BACKGROUND ART

A conventional multi-layered solid electrolytic capacitor has been fabricated in the following manner. As illustrated in FIG. 14, a dielectric oxide film 2 and a cathode layer 3 composed of a solid electrolyte layer 3a, a carbon layer 3b, and a silver paint layer 3c are successively formed over a surface of an aluminum foil 1, which is a valve metal, to prepare a capacitor element 6. Subsequently, as illustrated in FIG. 15, a plurality of the capacitor elements 6 in a stacked condition is connected to an anode terminal 12 by resistance welding, and they are connected to a cathode terminal 13 by a conductive adhesive 18. Finally, these components are covered with an exterior resin 14 to produce a multi-layered solid electrolytic capacitor.

When stacking the capacitor element 6, first, a capacitor element 6 is held at its cathode portion 8, and conveyed and placed onto a lead frame. Thereafter, the anode portion 7 of the capacitor element 6 is connected to the anode terminal 12 by resistance welding, and then, the connected anode portion 7 of the capacitor element 6 is welded to the anode portion 7 of another capacitor element 6 to be stacked thereover. The capacitor elements are stacked by repeating the above-described processes (see Patent Reference 1).

[Patent Reference 1] Japanese Published Unexamined Patent Application No. 11-135367

DISCLOSURE OF THE INVENTION

Problems to be Solved by the Invention

In the just-mentioned conventional multi-layered solid electrolytic capacitor, however, the thickness L11 of the anode portion 7 ≈100 μm and the thickness L12 of the cathode portion 8 is ≈200 μm, as shown in FIG. 14, so there is a large difference between the thickness L11 of the anode portion 7 and the thickness L12 of the cathode portion 8. Consequently, a bend forms at the boundary between the anode portion 7 and the cathode portion 8 as illustrated in FIG. 15. As a consequence, tensile stress and bending stress act on the boundary between the anode portion 7 and the cathode portion 8 or on the vicinity thereof (indicated by reference numeral 50 in FIG. 15) during the resistance welding, and the stresses build up in that part. Thus, cracks develop at the boundary between the anode portion 7 and the cathode portion 8 or in the anode portion 7 that is in the vicinity thereof, causing increases in leakage current of the capacitor or defects due to short circuits. This is especially noticeable in the capacitor elements 6 that are disposed more distant from the anode terminal 12.

Taking these things into consideration, it may appear conceivable to employ a structure in which a resin is applied or a tape is attached in the vicinity of the boundary between the anode portion 7 and the cathode portion 8. However, even when such a structure is employed, it is difficult to alleviate the stress that acts on the boundary between the anode portion 7 and the cathode portion 8 sufficiently. Moreover, in the case that a resin is applied, additional problems arise as follows; each capacitor element 6 becomes thick and accordingly the size of the multi-layered solid electrolytic capacitor increases (specifically, the height increases), and the manufacturing cost rises because an additional drying process becomes necessary in addition to the material cost for the resin. On the other hand, in the case of attaching a tape, additional problems arise as follows; precise bonding of the tape is troublesome and the size of the multi-layered solid electrolytic capacitor increases, as in the case of applying a resin.

The present invention has been accomplished in view of the foregoing circumstances, and it is an object of the invention to provide a multi-layered solid electrolytic capacitor and a method of manufacturing the capacitor that make it possible to improve the product yield drastically by preventing increases in leakage current and defects due to short circuits without increasing the manufacturing cost or the capacitor size.

Means for Solving the Problems

In order to accomplish the foregoing object, in accordance with aspects of the invention a multi-layered solid electrolytic capacitor is provided comprising: a plurality of capacitor elements, each comprising an anode body having an anode portion and a cathode portion having a dielectric oxide film and a cathode layer formed in succession on a surface of the anode body, wherein the plurality of capacitor elements are stacked on top of one another, the anode portions of adjacent capacitor elements are welded each other, and the anode portion of one of the outermost capacitor elements is weld-secured to an anode terminal, the multi-layered solid electrolytic capacitor being characterized in that: a stress alleviating groove and/or a stress alleviating hole is/are formed in between a welded part and the boundary between the anode and cathode portions in at least one of weld surfaces of the anode portion.

When a stress alleviating groove and/or a stress alleviating hole is/are formed in between a welded part and the boundary between the anode and cathode portions in at least one of weld surfaces of the anode portion, the physical strength of the vicinity reduces, and the anode portion bends in the vicinity of the stress alleviating groove or the stress alleviating hole during the resistance welding. Thus, the bending stress that acts on the boundary between the anode portion and the cathode portion or on the vicinity thereof reduces, and therefore, the stresses that act on that part reduces accordingly. As a result, it becomes possible to prevent an increase in leakage current of the capacitor and defects due to short circuits, which result from the cracks that develop at the boundary between the anode portion and the cathode portion or in the anode portion that is in the vicinity thereof.

Since it is only necessary to form the stress alleviating groove and so forth, the problem of size increase of the multi-layered solid electrolytic capacitor does not arise, and also, the manufacturing costs do not rise.

Moreover, in the case that the stress alleviating hole is provided, the stress alleviating hole is provided between the welded part and the boundary between the anode and cathode portions, and therefore, the heat applied during the welding can be prevented from escaping toward the cathode portion. As a result, the welding can be accomplished with a less heat quantity, so the advantageous effect of improved weldability is exhibited additionally.

In accordance with another aspect of the invention, the stress alleviating hole forms an oblong shape.

When the stress alleviating hole has an oblong shape in this way, the anode portion bends unfailingly at a predetermined position without degrading the strength of the region in which the stress alleviating hole is provided. The reason is as follows. For example, if the stress alleviating hole has a rectangular shape, cracks tend to develop at the four corners. If the stress alleviating hole has a perfect circular shape, the position at which the anode portion bends in the circular portion is not constant, and moreover, the diameter has to be small since the gap between the welded part and the boundary between the anode and cathode portions is not very large, in which case the stress alleviating effect may not be sufficient. In contrast, these inconveniences can be avoided when the stress alleviating hole has an oblong shape.

It should be noted that the oblong shape is meant to include elliptical shapes and the like.

In accordance with another aspect of the invention, the major axis of the stress alleviating groove or the stress alleviating hole is substantially parallel to the boundary between the anode and cathode portions.

When the major axis of the stress alleviating groove or the stress alleviating hole is not parallel to the boundary between the anode and cathode portions, the stress at one end part of the stress alleviating groove or the like becomes greater and cracks may develop from that part. On the other hand, when the major axis of the stress alleviating groove or the like is parallel to the boundary between the cathode portion and the foregoing anode portion, stresses act on the entire stress alleviating groove or the like, making it possible to prevent the cracks from developing in the stress alleviating groove or the like.

In accordance with another aspect of the invention, the stress alleviating groove is formed in an anode terminal-side surface of the weld surfaces of the anode portion.

The anode terminal-side surface of the weld surfaces of the anode portion has a greater curvature than that of the other surface by the thickness of the anode portion, so the anode terminal-side surface receives a greater stress. For this reason, a greater stress alleviating effect can be obtained by forming the stress alleviating groove in the anode terminal-side surface.

In accordance with yet another aspect of the invention, the stress alleviating groove or the stress alleviating hole is formed in the capacitor elements other than the capacitor element weld-secured to the anode terminal.

The invention as set forth in claim 5 is characterized in that, in the invention as set forth in any one of claims 1 through 4, the stress alleviating slit or the stress alleviating hole is formed in the capacitor elements other than the capacitor element weld-secured to the anode terminal.

The reason why such a restriction is made is as follows. The tilt angle of the anode portion extending from the cathode portion is 0° or extremely small in the capacitor element that is weld-secured to the anode terminal, so the bending stress at the boundary between the cathode portion and the anode portion or in the vicinity thereof is small. On the other hand, in the capacitor elements other than the capacitor element weld-secured to the anode terminal, the tilt angle of the anode portion extending from the cathode portion is greater by the difference of the thickness of the cathode portions and the anode portions of the capacitor elements that exist nearer the anode terminal side than the foregoing capacitor element, so the bending stresses at the boundary between the cathode portion and the anode portion or in the vicinity thereof are greater.

In accordance with another aspect of the invention, the stress alleviating groove or the stress alleviating hole is so formed that the more distant the anode portion is from the anode terminal, the greater the area of the stress alleviating groove or the stress alleviating hole in the weld surface.

As mentioned above, the more distant the anode portion is from the anode terminal, the greater the tilt angle of the anode portion that extends from the cathode portion will be. Therefore, the bending stresses at the boundary between the cathode portion and the anode portion or in the vicinity thereof are great. Accordingly, the stress alleviating effect corresponding to the intensity of the stress can be obtained when the stress alleviating groove or the stress alleviating hole is so formed that the more distant the anode portion is from the anode terminal, the greater the area of the stress alleviating groove or the stress alleviating hole in the weld surface.

In accordance with yet another aspect of the invention, at least one capacitor element is provided in which a plurality of the stress alleviating grooves or a plurality of the stress alleviating holes is formed.

When at least one capacitor element is provided in which a plurality of the stress alleviating grooves or a plurality of the stress alleviating holes is formed, the physical strength in the vicinity of the stress alleviating groove or the like reduces further, and therefore, a greater stress alleviating effect is obtained.

In accordance with another aspect of the invention, when the multi-layered solid electrolytic capacitor comprises a plurality of capacitor elements in which a plurality of the stress alleviating grooves or the stress alleviating holes are formed, the stress alleviating grooves or the stress alleviating holes are so formed that the more distant the anode portion is from the anode terminal, the greater the number of the stress alleviating grooves or the stress alleviating holes.

As mentioned above, the more distant the anode portion is from the anode terminal, the greater the tilt angle of the anode portion that extends from the cathode portion will be. Therefore, the bending stresses at the boundary between the cathode portion and the anode portion or in the vicinity thereof are great. Accordingly, the stress alleviating effect corresponding to the intensity of the stress can be obtained when the stress alleviating grooves or the stress alleviating holes are so formed that the more distant the anode portion is from the anode terminal, the greater the number of the stress alleviating grooves or the stress alleviating holes.

In accordance with yet another aspect of the invention, when the multi-layered solid electrolytic capacitor comprises both the stress alleviating groove and the stress alleviating hole, the stress alleviating groove is provided so as to be joined to the stress alleviating hole.

When only the stress alleviating hole is provided, the bend position in the area in which the stress alleviating hole does not exist may not be consistent. When the stress alleviating groove is provided so as to be joined to the stress alleviating hole as described above, the anode portion can be bent at a predetermined position even in the area in which the stress alleviating hole does not exist.

In order to accomplish the foregoing objects, in accordance with aspects of the present invention, a method of manufacturing a multi-layered solid electrolytic capacitor is provided, comprising: a first step of preparing capacitor elements each comprising an anode portion and a cathode portion in which a dielectric oxide film and a cathode layer are formed successively over a surface of an anode body; a second step of forming a stress alleviating groove and/or a stress alleviating hole in at least one weld surface of the anode portion; a third step of weld-securing an anode terminal to the anode portion of one of the capacitor elements; and a fourth step of, in a state where another capacitor element is stacked on the one of the capacitor element weld-secured the anode terminal, weld-securing anode portions of adjacent capacitor elements to each other.

The just-described method makes it possible to easily manufacture a multi-layered solid electrolytic capacitor as described above.

In accordance with yet another aspect of the present invention, the stress alleviating groove and/or the stress alleviating hole is/are formed by a laser application method.

When the stress alleviating groove or the like is formed by a laser application method as described above, the stress alleviating groove or the like can be formed reliably and quickly. Moreover, when the oxide film in the stack and weld part is removed by the laser method, the problem of an increase in the manufacturing steps does not arise.

It should be noted that whether the stress alleviating hole or the stress alleviating groove is formed may be realized by adjusting the laser beam diameter, the laser power, and so forth.

In accordance with another aspect of the present invention, the stress alleviating hole is formed in a weld surface of the anode portion and the stress alleviating groove is formed in at least one weld surface of the anode portion so as to be joined to the stress alleviating hole.

The just-described method makes it possible to easily manufacture a multi-layered solid electrolytic capacitor as described above.

Advantages of the Invention

The present invention exhibits significant advantageous effects that the product yield of the multi-layered solid electrolytic capacitor can be drastically improved by preventing increases in leakage current and defects due to short circuits without increasing the manufacturing cost or the capacitor size.

BEST MODE FOR CARRYING OUT THE INVENTION

It should be construed that the multi-layered solid electrolytic capacitor according to the present invention is not limited to those shown in the following embodiments, and various changes and modifications are possible without departing from the scope of the invention.

First Embodiment (Structure of Multi-Layered Solid Electrolytic Capacitor)

A multi-layered solid electrolytic capacitor according to a first embodiment is described in detail with reference to FIGS. 1 through 6. FIG. 1 is a vertical cross-sectional view of a multi-layered solid electrolytic capacitor according to the first embodiment. FIG. 2 is a plan view of a capacitor element used in the first embodiment. FIG. 3 is a cross-sectional view taken along line A-A in FIG. 2. FIG. 4 is a cross-sectional view illustrating a primary portion enlarged of a capacitor element used in the first embodiment. FIG. 5 is a cross-sectional view illustrating a primary portion enlarged of the multi-layered solid electrolytic capacitor according to the first embodiment. FIG. 6 is a plan view illustrating a manufacturing step of the multi-layered solid electrolytic capacitor according to the first embodiment.

As illustrated in FIG. 1, a multi-layered solid electrolytic capacitor 10 is furnished with a plurality of sheets (four sheets in this example) of capacitor elements 6 stacked on top of one another, and an anode terminal 12 and a cathode terminal 13 are attached to the lower face of the capacitor element 6 that is in the lowermost position in the stacked state. The capacitor elements 6, the anode terminal 12, and the cathode terminal 13 are configured to be covered with a synthetic resin 14 except for the lower faces of the anode terminal 12 and the cathode terminal 13.

As illustrated in FIGS. 2 and 3, each capacitor element 6 has a dielectric oxide film 2 and a cathode layer 3 formed over the surface of an aluminum foil 1, which serves as an anode body and is a valve metal. The cathode layer 3 comprises a solid electrolyte layer 3a made of a polythiophene-based conductive polymer, a carbon layer 3b, and a silver paint layer 3c. A portion thereof in which the cathode layer 3 is formed over the dielectric oxide film 2 forms a cathode portion 8, and a portion thereof in which the cathode layer 3 is not formed forms an anode portion 7. A plurality of sheets of the capacitor elements 6 with such a configuration is stacked on top of one another, and the anode portions 7 of the adjacent capacitor elements 6 are weld-secured to one another (at least one surface of the upper and lower surfaces of each anode portion forms a weld surface) while the cathode portions 8 of the adjacent capacitor elements 6 are adhesive-bonded to one another by conductive adhesive 18, whereby the multi-layered solid electrolytic capacitor 10 is formed. It should be noted that as illustrated in FIGS. 1 and 2, the dimensions of the multi-layered solid electrolytic capacitor are designed as follows; the length L1 of the cathode portions 8 is 3.8 mm, the length L2 of the anode portions 7 is 2.2 mm, the width L3 of the capacitor elements 6 is 3.5 mm, and the height L4 of the multi-layered solid electrolytic capacitor is 1.5 mm. In FIG. 2, reference numeral 20 designates a contact position with which a resistance welding rod is brought into contact, and after the welding, the part that corresponds to the contact position forms a welded part.

Here, as illustrated in FIG. 4, in the capacitor element 6 used in the multi-layered solid electrolytic capacitor 10, a first stress alleviating groove 16 and a second stress alleviating groove 17 are provided in the vicinity of a boundary 15 between the cathode portion 8 and the anode portion 7 (i.e., in between the boundary 15 and the contact position 20 of the resistance welding rod) in the anode terminal 12 side surface of the anode portion 7 (i.e., in the lower surface thereof). The first stress alleviating groove 16 is designed to have a width L5 of 200 µm, a depth L6 of 30 µm, and a distance L7 from the boundary 15 of 300 µm, while the second stress alleviating groove 17 is designed to have a width L8 of 200 µm, a depth L9 of 30 µm, and a distance L10 from the boundary 15 of 700 µm. Since the stress alleviating grooves 16 and 17 exist in this way, the anode portion 7 bends at the stress alleviating grooves 16 and 17, as illustrated in FIG. 5. Thus, the bending stress that acts on the boundary 15 between the anode portion 7 and the cathode portion 8 or on the vicinity thereof reduces, and therefore, the stresses that act on that part reduces accordingly. As a result, it becomes possible to prevent the increase in leakage current of the capacitor and the defects due to short circuits, which result from the cracks that develop at the boundary 15 between the anode portion 7 and the cathode portion 8 or in the anode portion 7 that is in the vicinity thereof.

(Manufacturing Method of Multi-Layered Solid Electrolytic Capacitor)

First, a method of manufacturing a capacitor element 6 is illustrated. This method is the same as a conventional method.

Specifically, an aluminum foil 1 was subjected to a formation process in an aqueous solution of an adipic acid or the like at a predetermined concentration with a predetermined voltage to form a dielectric oxide film 2 made of a metal oxide. Thereafter, the aluminum foil was immersed to a predetermined position in a mixture solution of 3,4-ethylenedioxythiophene, ferric p-toluenesulfonate, and 1-butanol, to form a solid electrolyte layer 3a made of a conductive polymer, 3,4-ethylenedioxythiophene, on the dielectric oxide film 2 by a chemical oxidative polymerization. Next, the aluminum foil 1 on which the solid electrolyte layer had been formed was immersed in a solution in which carbon powder was diffused in an aqueous solution or an organic solvent, and then dried at a predetermined temperature for a predetermined time. This process was repeated several times to form a carbon layer 3b. Finally, a silver paint layer 3c was formed on the surface of the carbon layer 3b, whereby a capacitor element 6 was prepared.

Subsequently, prior to stacking and welding of a plurality of the capacitor elements 6, a first stress alleviating groove 16 and a second stress alleviating groove 17 were formed in each of the capacitor elements 6. Specifically, the formation of the grooves was conducted by applying a laser beam to a vicinity of the boundary 15 between the cathode portion 8 and the anode portion 7 in the anode terminal 12 side surface of the anode portion 7 under the following laser conditions.

Laser Conditions
Laser power: 3 W
Laser beam diameter: 200 μm

Next, as illustrated in FIG. 6, the anode portion 7 of the capacitor element 6 was connected to the anode terminal 12 by resistance welding, and the cathode portion 8 of the capacitor element 6 was adhesive-bonded to the cathode terminal 13 with a conductive adhesive 18. A plurality of sheets of capacitor elements 6 was stacked on top of one another by using resistance welding and the conductive adhesive 18. Lastly, the stack was sealed by an exterior resin 14 to complete a 16 V-10 μF multi-layered solid electrolytic capacitor 10.

Second Embodiment

A multi-layered solid electrolytic capacitor according to a second embodiment is described in detail with reference to FIG. 7. FIG. 7 is a plan view of a capacitor element according to the second embodiment.

What is different from the foregoing first embodiment is that, as illustrated in FIG. 7, a stress alleviating hole 22 is provided in the vicinity of the boundary 15 between the cathode portion 8 and the anode portion 7 (i.e., in between the boundary 15 and a contact position 20 of the resistance welding rod), in place of the first stress alleviating groove 16 and the second stress alleviating groove 17. This stress alleviating hole 22 forms an oblong shape, and it is formed so that its major axis 23 is parallel to the boundary 15 between the cathode portion 8 and the anode portion 7. The length L13 of the stress alleviating hole 22 along the major axis 23 is designed to be 1.3 mm and the distances L14 and L15 from the edges are both 1.1 mm. The length L17 of the stress alleviating hole 22 along its minor axis 24 is designed to be 500 μm and the distance L16 from the above-described boundary 15 is 300 μm.

Here, the stress alleviating hole 22 was formed by applying a laser beam to a vicinity of the boundary 15 between the cathode portion 8 and the anode portion 7 in the anode terminal 12 side surface of the anode portion 7 under the following laser conditions.

Laser Conditions
Laser power: 8 W
Laser beam diameter: 200 μm

Since the stress alleviating hole 22 exists in this way in place of the stress alleviating grooves 16 and 17, the anode portion 7 likewise bends at the stress alleviating hole 22. Thus, the bending stress that acts on the boundary 15 between the anode portion 7 and the cathode portion 8 or on the vicinity thereof reduces, and therefore, the stresses that act on that part reduces accordingly. As a result, it becomes possible to prevent the increase in leakage current of the capacitor and the defects due to short circuits, which result from the cracks that develop at the boundary 15 between the anode portion 7 and the cathode portion 8 or in the anode portion 7 that is in the vicinity thereof.

Moreover, since the hole is provided between the contact position 20 of the resistance welding rod and the boundary 15 between the anode and cathode portions 7 and 8, the heat applied to the resistance welding rod can be prevented from escaping toward the cathode portion 8. As a result, the welding can be accomplished with a less heat quantity, so the advantageous effect of improved weldability is exhibited additionally.

EXAMPLES

First Working Example

Example 1

A multi-layered solid electrolytic capacitor fabricated in the same manner as described in the foregoing first embodiment in the Best Mode for Carrying out the Invention was used as the multi-layered solid electrolytic capacitor of Example 1.

The multi-layered solid electrolytic capacitor in this manner is hereinafter referred to as an inventive capacitor A1.

Example 2

A multi-layered solid electrolytic capacitor was fabricated in the same manner as in the inventive capacitor A1, except that, in each of the capacitor elements 6, the first stress alleviating groove 16 and the second stress alleviating groove 17 were provided in the vicinity of the boundary 15 between the cathode portion 8 and the anode portion 7 in the surface opposite the anode terminal 12 side surface of the anode portion 7 (i.e., in the upper surface), as illustrated in FIG. 8.

The multi-layered solid electrolytic capacitor in this manner is hereinafter referred to as an inventive capacitor A2.

Comparative Example 1

A multi-layered solid electrolytic capacitor was fabricated in the same manner as in the inventive capacitor A1, except that the first stress alleviating groove 16 and the second stress alleviating groove 17 were not provided, as illustrated in FIGS. 14 and 15.

The multi-layered solid electrolytic capacitor fabricated in this manner is hereinafter referred to as a comparative capacitor X1.

Comparative Example 2

A multi-layered solid electrolytic capacitor was fabricated in the same manner as in the inventive capacitor A1, except that the first stress alleviating groove 16 and the second stress alleviating groove 17 were not provided, and that a thermosetting epoxy resin was applied to the boundary 15 between the cathode portion 8 and the anode portion 7 and in the vicinity thereof.

The multi-layered solid electrolytic capacitor fabricated in this manner is hereinafter referred to as a comparative capacitor X2.

Comparative Example 3

A multi-layered solid electrolytic capacitor was fabricated in the same manner as in the inventive capacitor A1, except that the first stress alleviating groove 16 and the second stress alleviating groove 17 were not provided, and that a heat-resistant polyimide tape was adhered to the vicinity of the boundary 15 between the cathode portion 8 and the anode portion 7.

The multi-layered solid electrolytic capacitor fabricated in this manner is hereinafter referred to as a comparative capacitor X3.

(Experiment)

100 samples of each of the inventive capacitors A1 and A2 and the comparative capacitors X1 to X3 were prepared, and the leakage current values for each of the multi-layered solid electrolytic capacitors were determined prior to the leakage current repairing process (aging). The results are shown in Table 1.

TABLE 1

| Leakage current (μA) 16 V · 40 s | Inventive capacitor A1 | Inventive capacitor A2 | Comparative capacitor X1 | Comparative capacitor X2 | Comparative capacitor X3 |
|---|---|---|---|---|---|
| -300 | 32 | 12 | — | — | — |
| 300-600 | 39 | 20 | — | 1 | — |
| 600-900 | 24 | 32 | — | 15 | 5 |
| 900-1200 | 4 | 20 | — | 23 | 10 |
| 1200-1500 | 1 | 8 | — | 13 | 16 |
| 1500-1800 | — | 6 | 18 | 24 | 13 |
| 1800-2100 | — | 2 | 37 | 7 | 12 |
| 2100-2400 | — | — | 13 | 1 | 5 |
| 2400-2700 | — | — | 10 | 2 | 1 |
| 2700-3000 | — | — | 2 | — | 3 |
| 3000- | — | — | 15 | 14 | 35 |
| Number of short defectives | 0 | 0 | 5 | 7 | 10 |

As clearly seen from Table 1, the comparative capacitor X1 showed very large leakage current values and caused short circuits, and although the comparative capacitors X2 and X3 showed slightly smaller leakage current values, the improvement effect was not sufficient and they also caused short circuits. In contrast, the inventive capacitors A1 and A2 exhibited sufficiently small leakage current values and caused no short circuits. In particular, it is understood that the leakage current values were remarkably small in the inventive capacitor A1, in which the stress alleviating grooves are provided in the anode terminal-side surface of the anode portion.

It is believed that these results are attributed to the following reason. In the comparative capacitors X1 to X3, tensile stress and bending stress act on the boundary between the anode portion and the cathode portion or the vicinity thereof during the resistance welding and the stresses build up in that part. As a consequence, cracks develop at the boundary between the anode portion and the cathode portion or in the anode portion that is in the vicinity thereof, causing an increase in leakage current of the capacitor and capacitor defects due to short circuits. In contrast, in the inventive capacitors A1 and A2, the anode portion bends at the stress alleviating grooves during the resistance welding; therefore, the bending stress that acts on the boundary between the anode portion and the cathode portion or the vicinity thereof reduces, and the stress that acts on that part reduces accordingly. Thus, it is believed that it becomes possible to prevent the increase in leakage current of the capacitor and the defects due to short circuits, which result from the cracks that develop at the boundary between the anode portion and the cathode portion or in the anode portion that is in the vicinity thereof.

Second Working Examples

Example

A multi-layered solid electrolytic capacitor fabricated in the same manner as described in the foregoing second embodiment in the Best Mode for Carrying out the Invention was used as the multi-layered solid electrolytic capacitor of this example.

The multi-layered solid electrolytic capacitor in this manner is hereinafter referred to as an inventive capacitor B.

Comparative Example

The comparative capacitor X1 as described in Comparative Example 1 of the foregoing first working examples was used as a comparative example.

(Experiment)

20 samples of each of the inventive capacitor B and the comparative capacitor X1 were fabricated, and the numbers of cracks developed were determined for each of the multi-layered solid electrolytic capacitors after the stacking. The results are shown in Table 2. It should be noted that whether or not there were cracks was determined by observing the boundary between the cathode portion and the anode portion with a microscope.

TABLE 2

| Capacitor | Invention capacitor B | Comparative capacitor X1 |
|---|---|---|
| Number of samples in which cracks developed | 0 | 14 |

Number of samples: 20 for each capacitor.

As clearly seen from Table 2, cracks were developed in a large number of samples of the comparative capacitor X1, but no cracks were observed in the samples of the inventive capacitor B.

It is believed that such results were obtained for the same reason as discussed in Experiment in the first working examples.

Other Embodiments (1) Although all the capacitor elements were provided with the stress alleviating grooves in the first working examples, it is possible that, for example, the capacitor element that is weld-secured to the anode terminal may be provided with no stress alleviating groove.

The reason is as follows. As illustrated in FIG. 5, the bend of the anode portion 7 of a capacitor element 6 is greater when the capacitor element 6 is more distant from the anode terminal 12. That is, referring to FIG. 5, tilt angle $\theta_1$ of the anode portion 7 of the capacitor element 6 in the first layer (i.e., the anode portion 7 that is weld-secured to the anode terminal 12)<tilt angle $\theta_2$ of the anode portion 7 of the capacitor element 6 in the second layer<tilt angle $\theta_3$ of the anode portion 7 of the capacitor element 6 in the third layer<tilt angle $\theta_4$ of the anode portion 7 of the capacitor element 6 in the fourth layer. Thus, in the capacitor element 6 of the first layer, the anode portion 7 does not bend, or the bend is very small even if it bends, at the time of resistance welding, so the problem is insignificant even if no stress alleviating groove is formed therein.

(2) Although two stress alleviating grooves are provided in the first working examples, the invention is not limited to such a structure. Of course, as illustrated in FIG. 9, only one stress alleviating groove 16 may be provided, or three or more alleviating grooves may be provided. In this case, it is desirable to employ the structure in which the more distant the anode portion is from the anode terminal, the greater the number of the stress alleviating grooves therein.

(3) Although the stress alleviating grooves are provided in only one surface in the first working examples, the invention is not limited to such a structure. It is of course possible to provide the stress alleviating grooves in both surfaces.

(4) Although all the stress alleviating grooves have the same width in the first working examples, the invention is not limited to such a structure. It is of course possible to employ a structure in which the more distant the anode portion is from the anode terminal, the wider the width of the stress alleviating grooves. In addition, the stress alleviating grooves may not necessarily be formed from one edge to the other edge of the anode portion, but may be formed in only a portion thereof.

(5) Although only one stress alleviating hole is provided in the second working examples, the invention is not limited to such a structure. Of course, as illustrated in FIG. 10, two stress alleviating holes 22 may be provided, or even three or more alleviating holes may be provided.

(6) Although only the stress alleviating hole is provided in the second working examples, the invention is not limited to such a structure. Of course, as illustrated in FIG. 11, stress alleviating grooves may be provided so as to be connected to the opposing ends of the stress alleviating hole 22.

(7) Although all the stress alleviating holes have the same size in the second working examples, the invention is not limited to such a structure. It is of course possible to employ a structure in which the more distant the anode portion is from the anode terminal, the greater the size of the stress alleviating hole (i.e., in a stress alleviating hole that is positioned distant from the anode terminal, a structure in which the length along the major axis is greater, as illustrated in FIG. 11). Alternatively, it is possible to employ a structure in which all the stress alleviating holes are the same but the more distant the anode portion is from the anode terminal, the greater the number of the stress alleviating holes.

(8) Although all the capacitor elements were provided with the stress alleviating hole in the second working examples, it is possible that, for example, the capacitor element that is weld-secured to the anode terminal may be provided with no stress alleviating hole. The reason is the same as described in the foregoing (1).

(9) Although the stress alleviating hole has an oblong shape in the second working examples, the invention is not limited to such a structure. It is also possible that, for example, the stress alleviating hole have a perfect circular shape, or a rectangular shape as illustrated in FIG. 13. However, it is more desirable that an oblong shape is employed because, when a rectangular shape is employed, cracks may develop at the four corners.

(10) The laser powers and laser beam diameters adopted in the two working examples are not limited to the values as described above, but may be changed as appropriate taking into consideration the groove depth, the hole size, the anode body material, the production efficiency, and the like. In this case, it is preferable to employ a laser power of from about 5 W to about 80 W.

(11) The valve metal is not limited to aluminum as described above but may also be tantalum, niobium, and the like. The solid electrolyte layer is not limited to a polythiophene-based conductive polymer, but may also be one of a polypyrrole-based conductive polymer, a polyaniline-based conductive polymer, a polyfuran-based conductive polymer, and manganese dioxide.

INDUSTRIAL APPLICABILITY

The present invention is applicable to, for example, power supply circuits for mobile telephones, notebook computers, and PDAs.

DESCRIPTION OF REFERENCE NUMERALS

Figure 1:
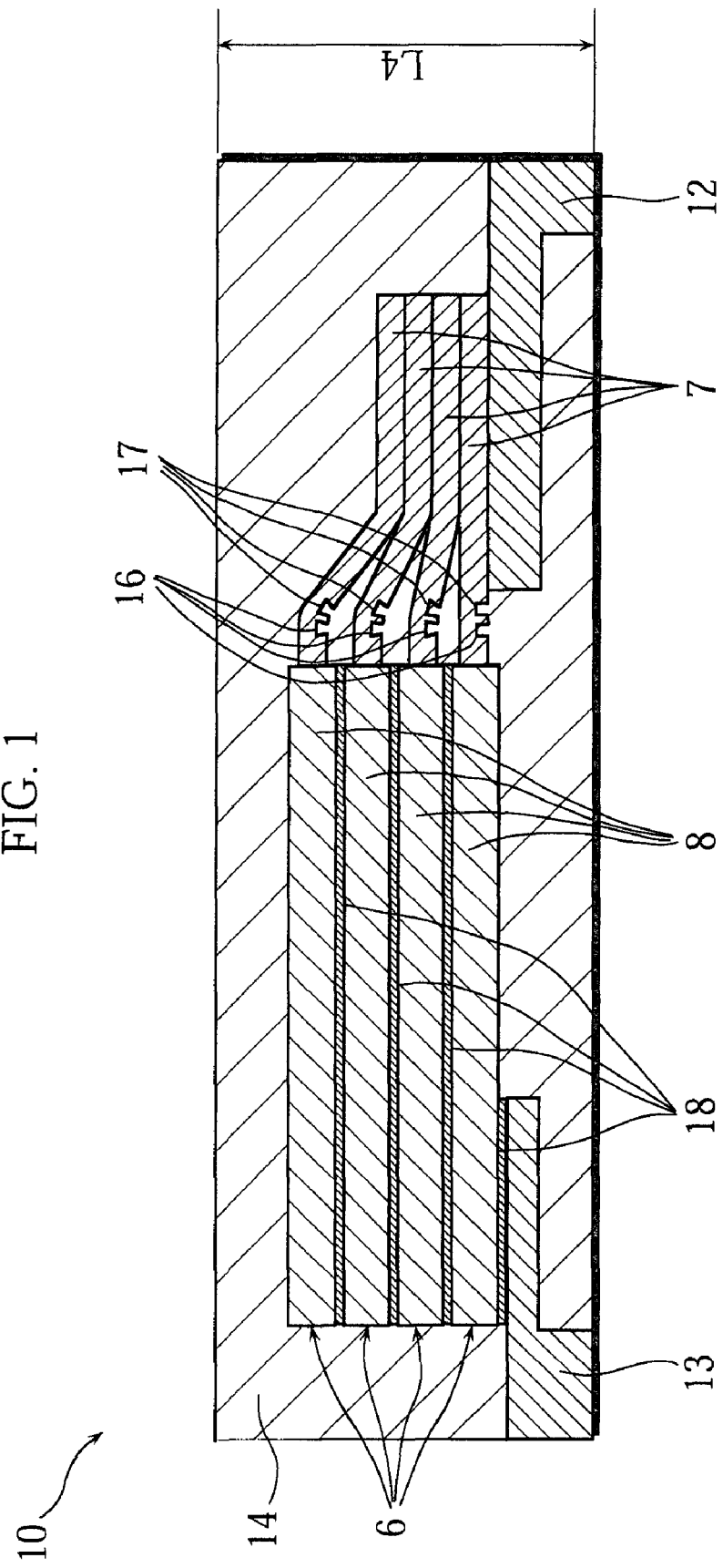
FIG. 1 is a vertical cross-sectional view of a multi-layered solid electrolytic capacitor according to the first embodiment.
Figure 2:
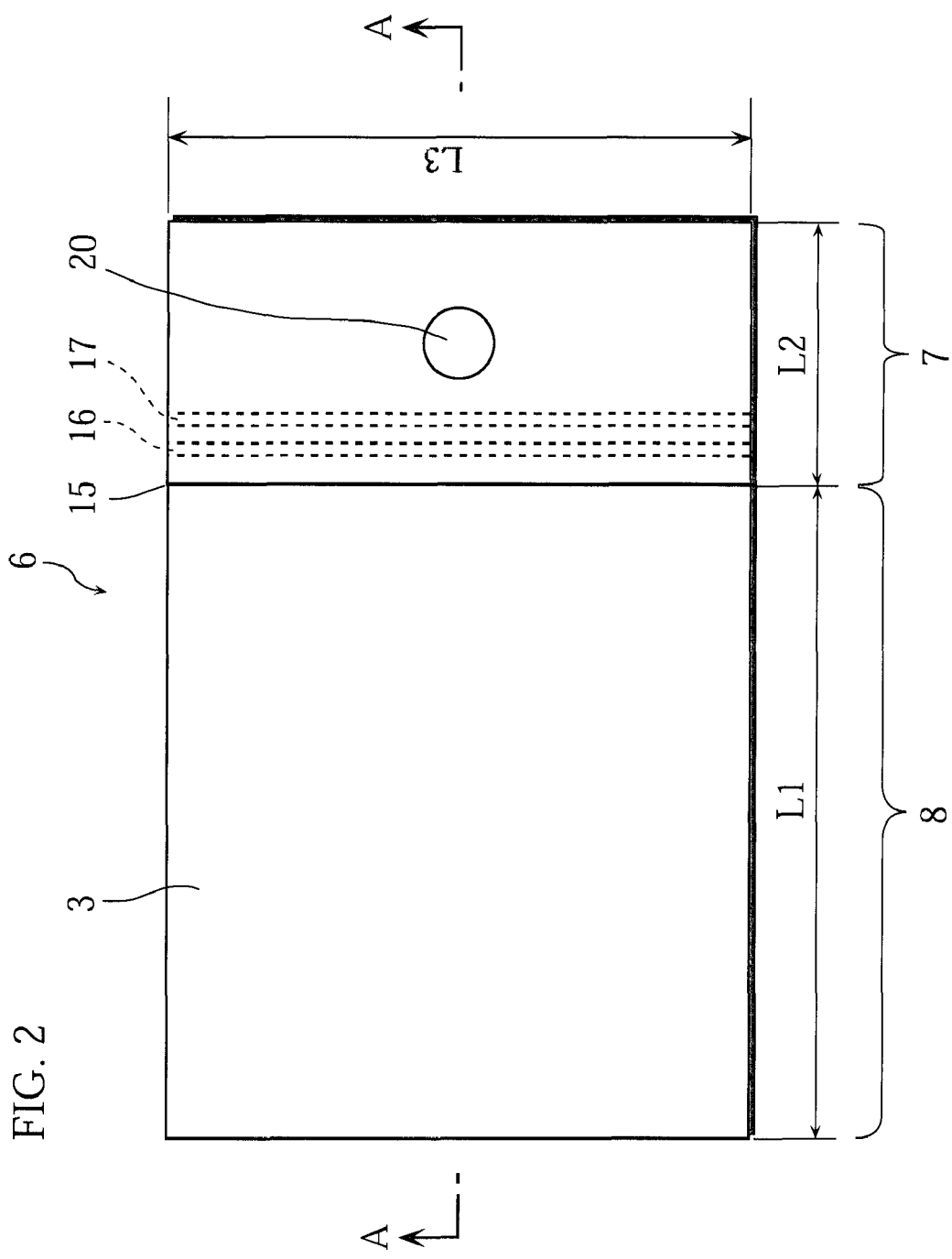
FIG. 2 is a plan view of a capacitor element used in the first embodiment.
Figure 3:
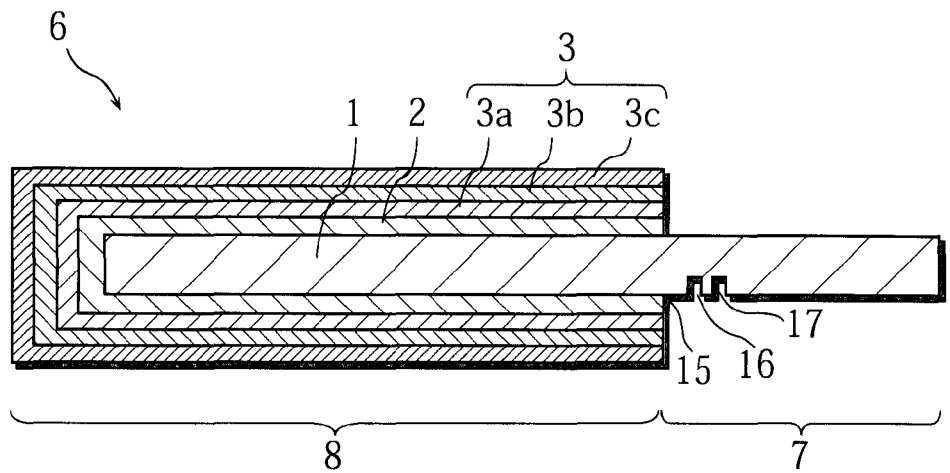
FIG. 3 is a cross-sectional view taken along line A-A in FIG. 2.
Figure 4:
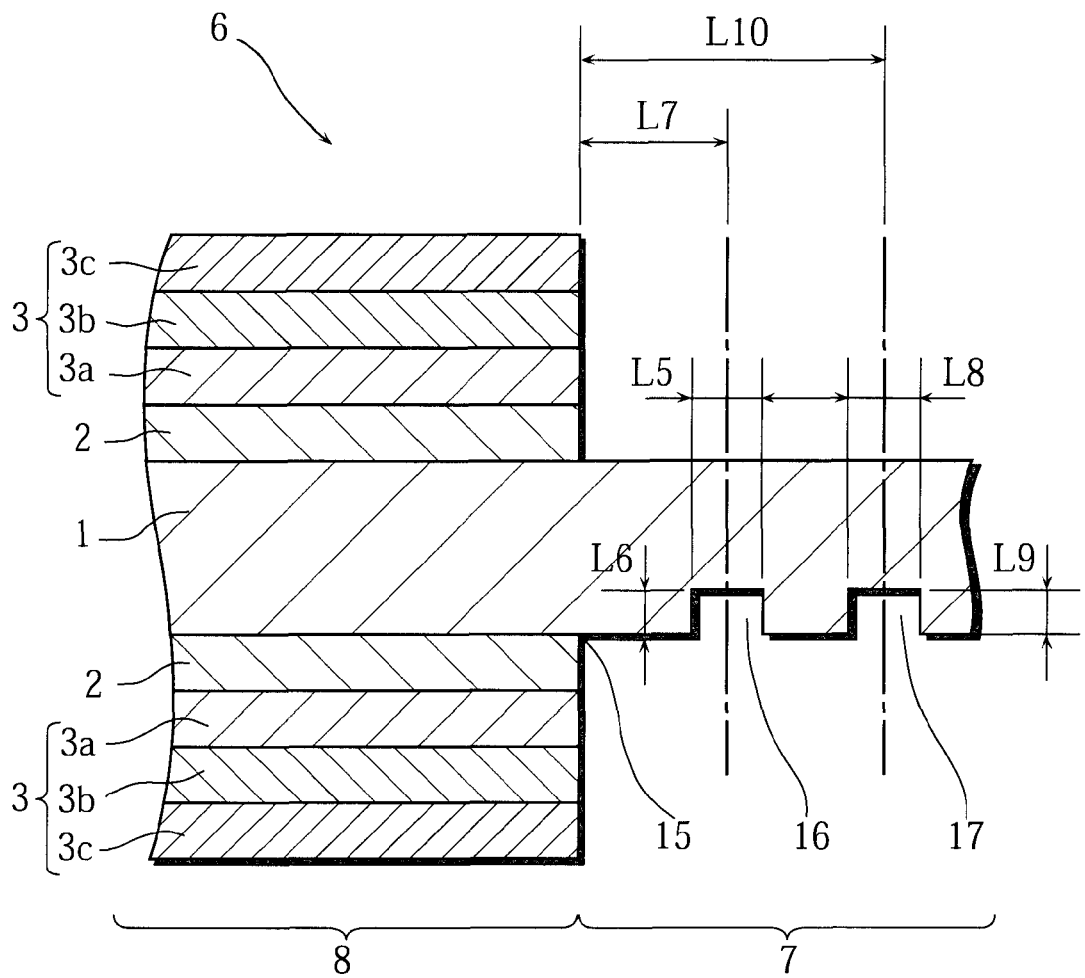
FIG. 4 is a cross-sectional view illustrating a primary portion enlarged of a capacitor element used in the first embodiment.
Figure 5:
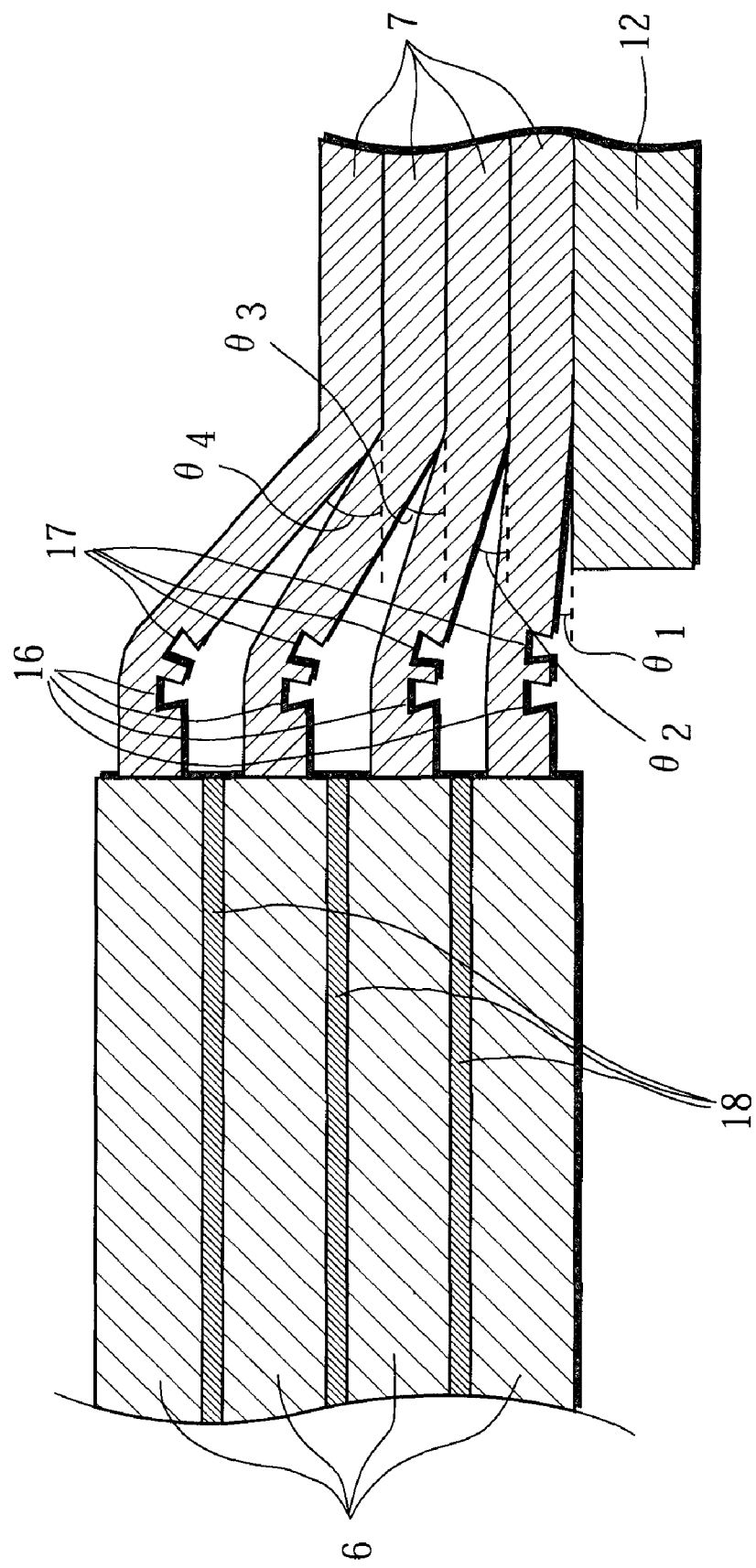
FIG. 5 is a cross-sectional view illustrating a primary portion enlarged of the multi-layered solid electrolytic capacitor according to the first embodiment.
Figure 6:
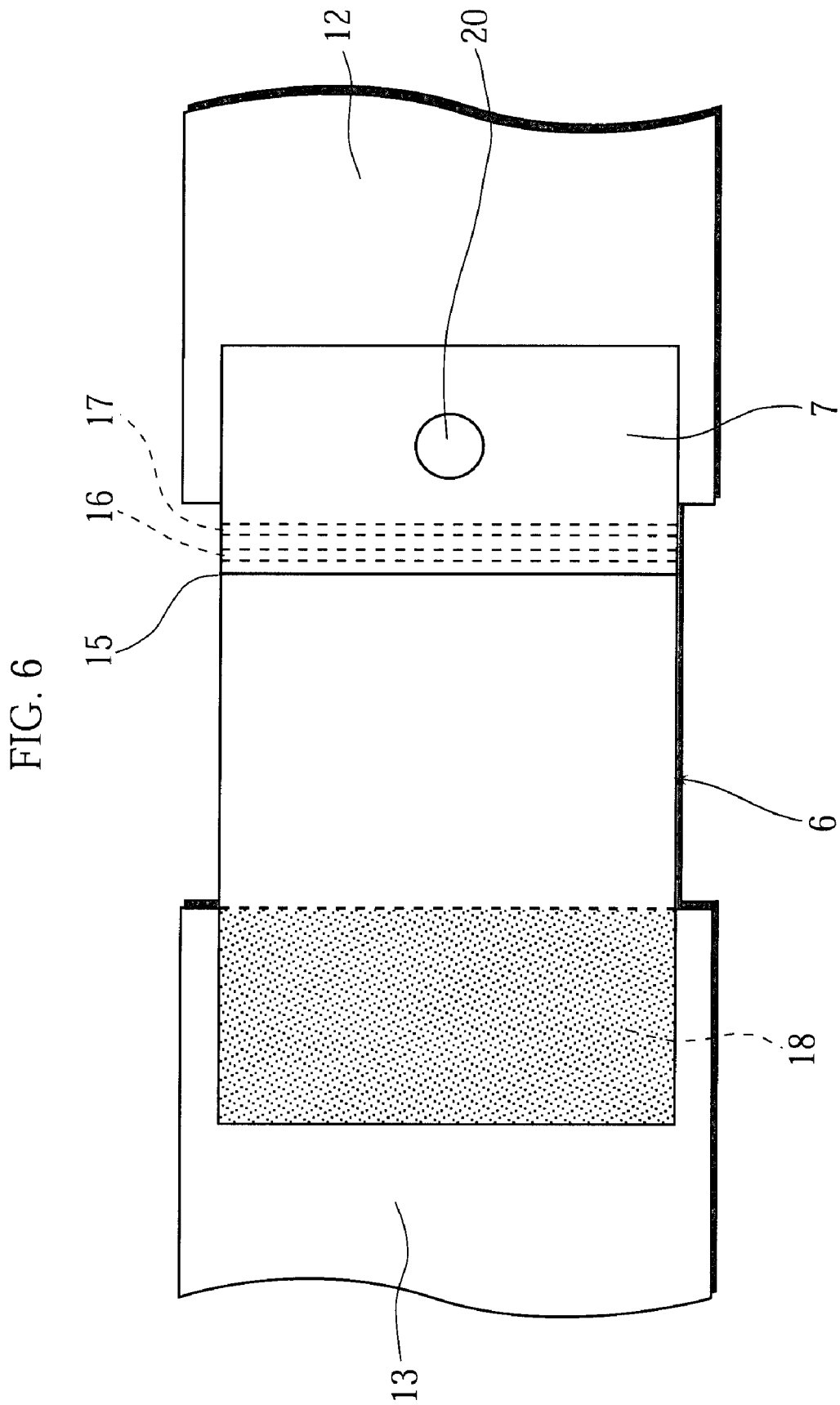
FIG. 6 is a plan view illustrating a manufacturing step of the multi-layered solid electrolytic capacitor according to the first embodiment.
Figure 7:
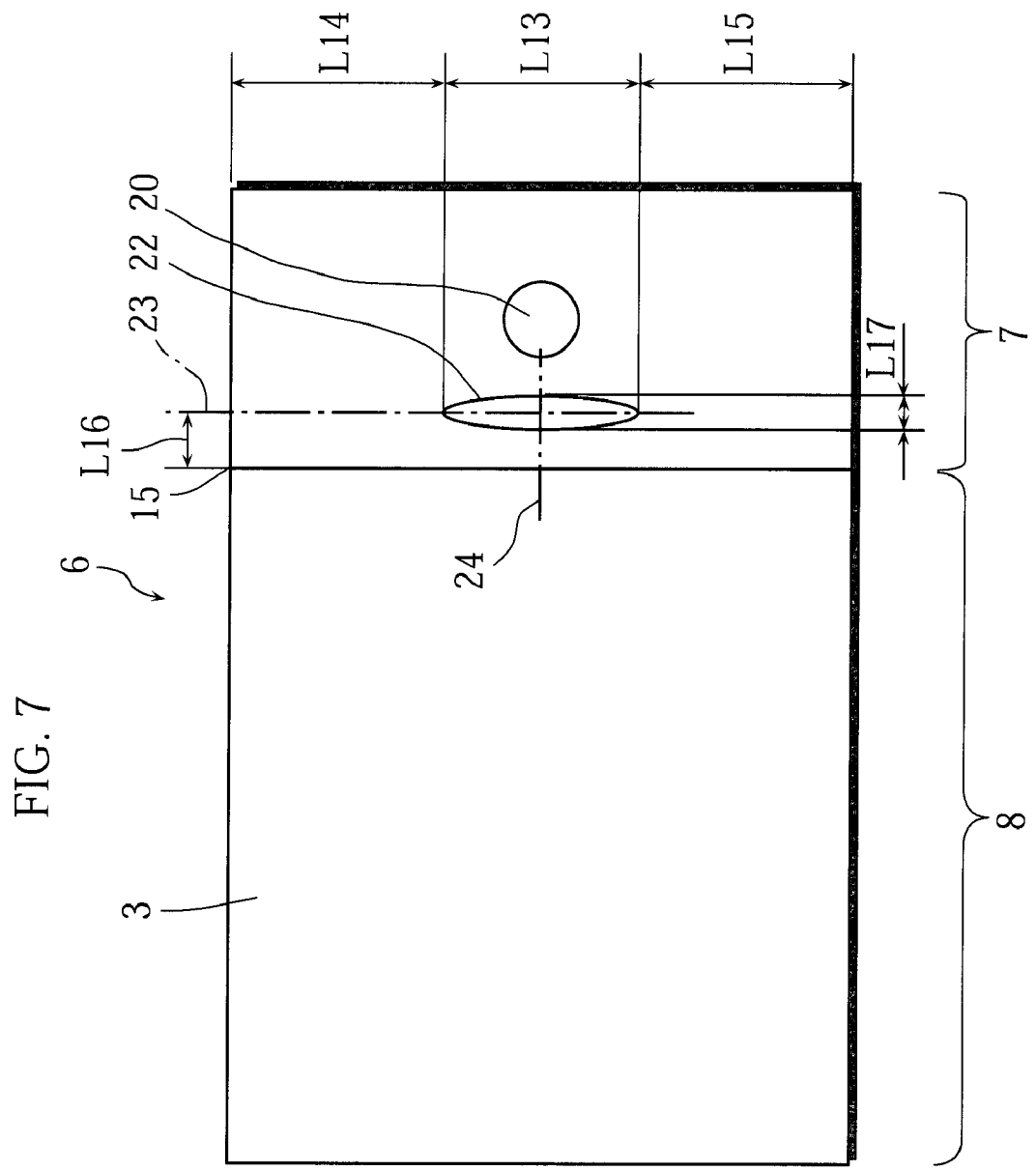
FIG. 7 is a plan view of a capacitor element used in the second embodiment.
Figure 8:
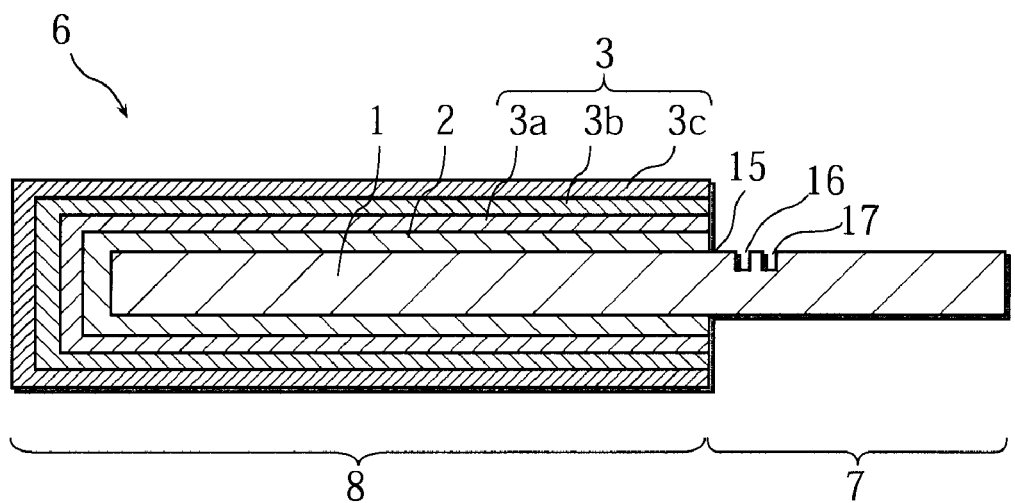
FIG. 8 is a cross-sectional view illustrating a modified example of a capacitor element used in the first embodiment.
Figure 9:
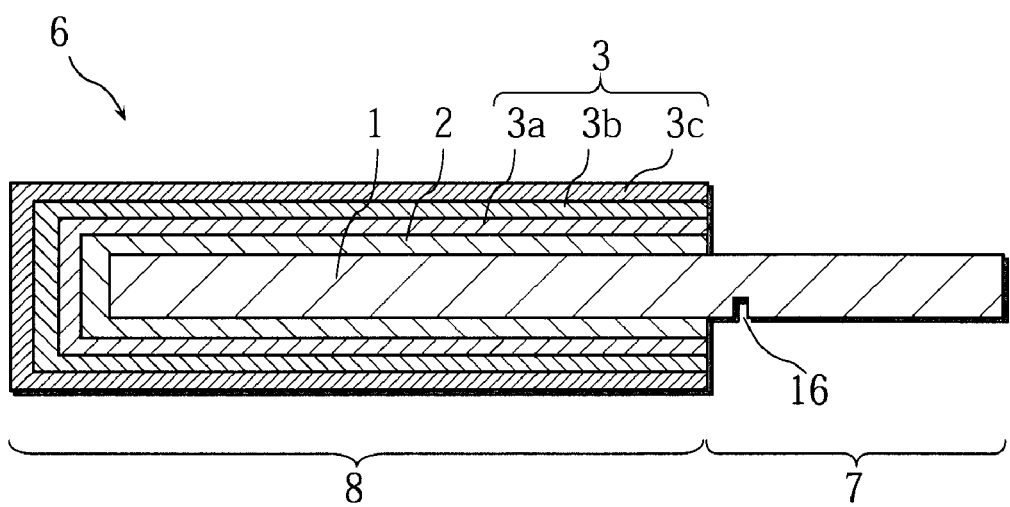
FIG. 9 is a cross-sectional view illustrating another modified example of a capacitor element used in the first embodiment.
Figure 10:
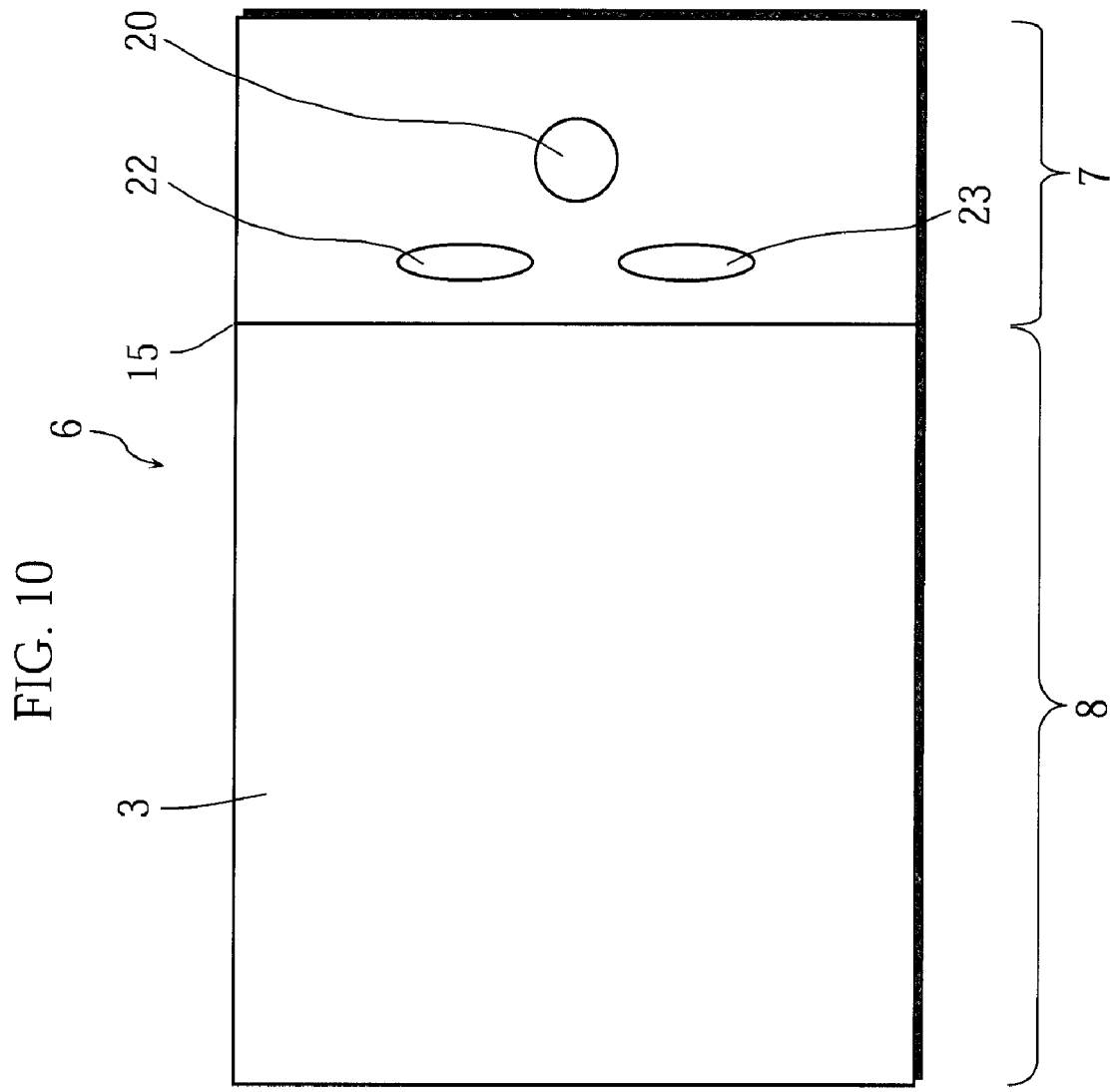
FIG. 10 is a plan view illustrating a modified example of a capacitor element used in the second embodiment.
Figure 11:
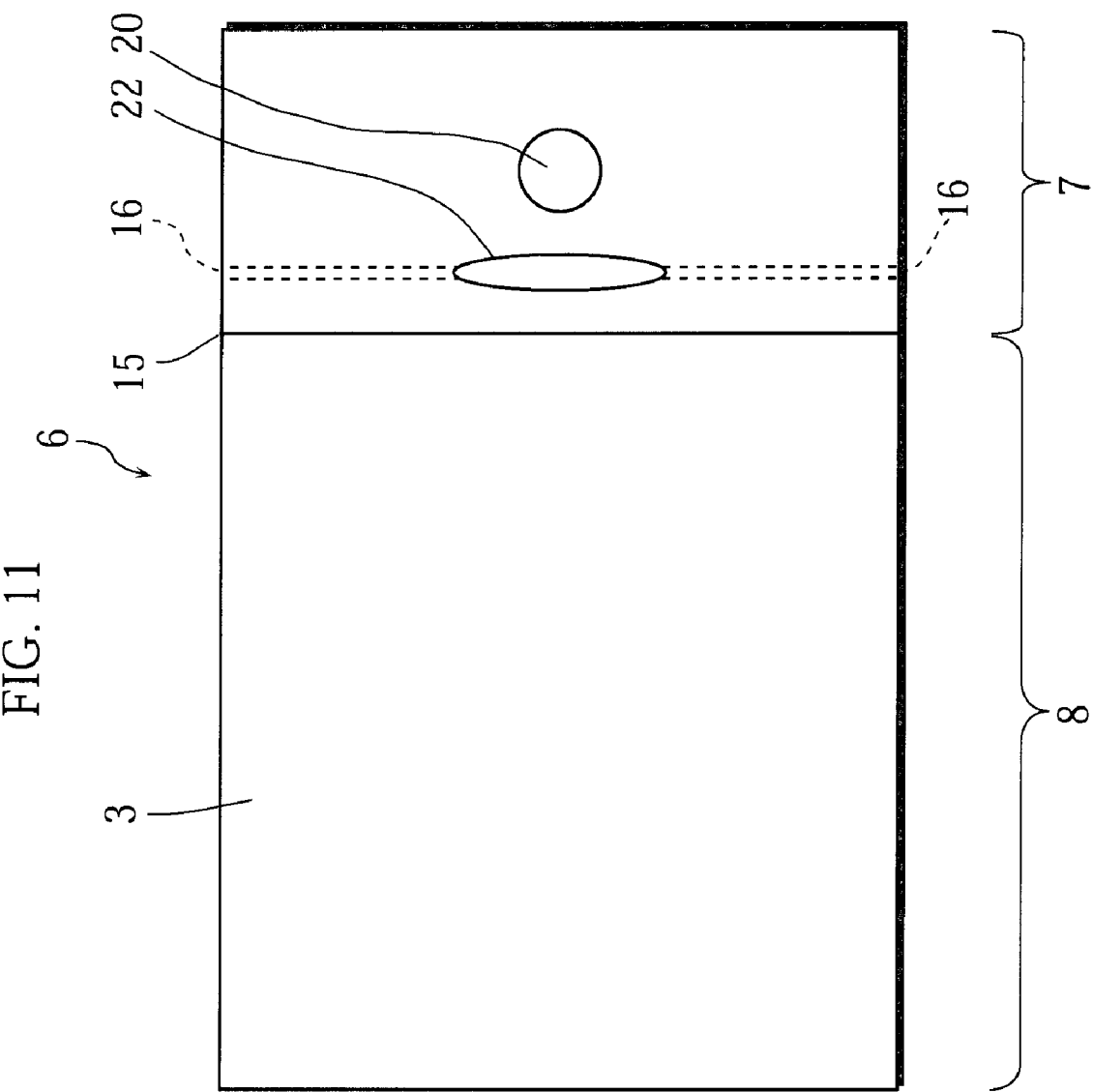
FIG. 11 is a plan view illustrating another modified example of a capacitor element used in the second embodiment.
Figure 12:
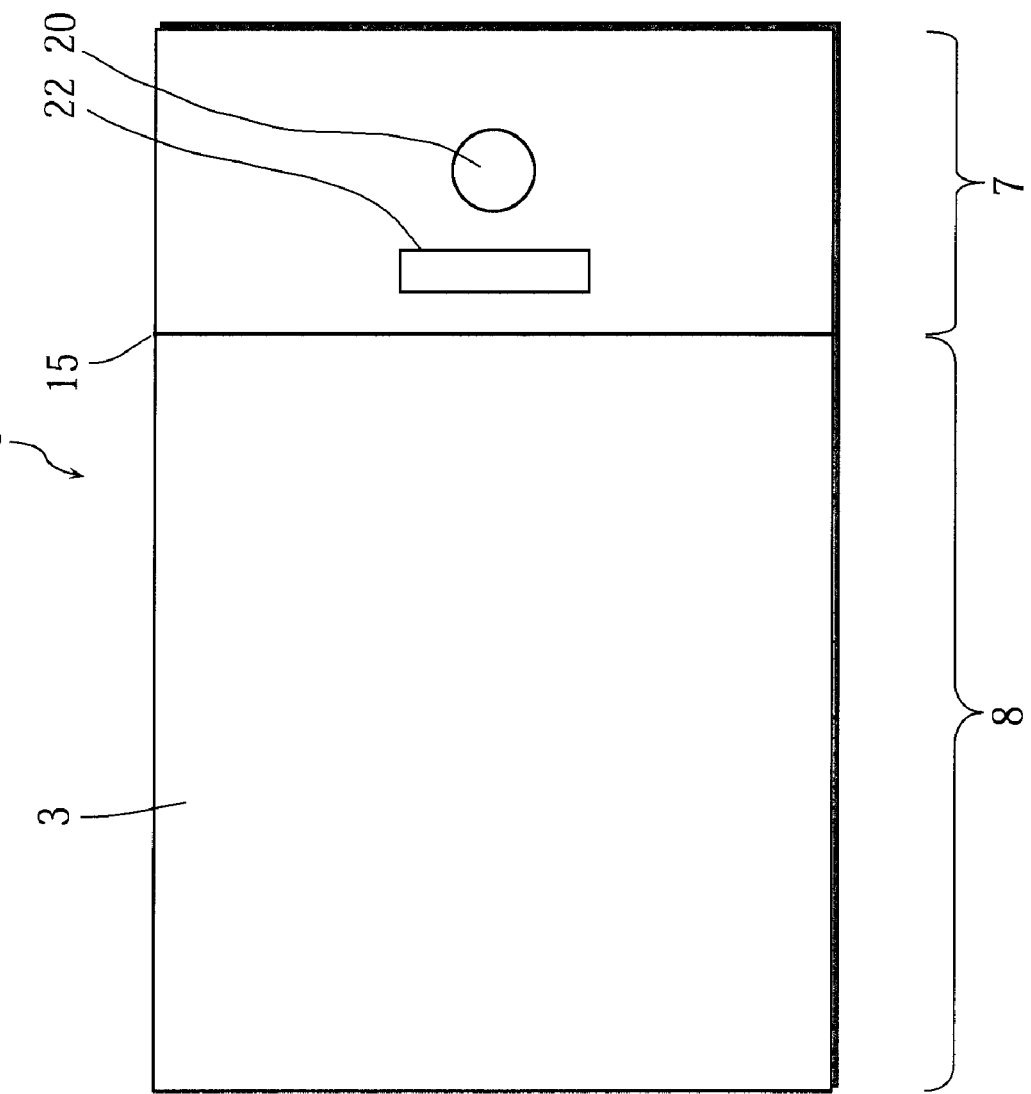
FIG. 12 is a plan view illustrating yet another modified example of a capacitor element used in the second embodiment.
Figure 13:
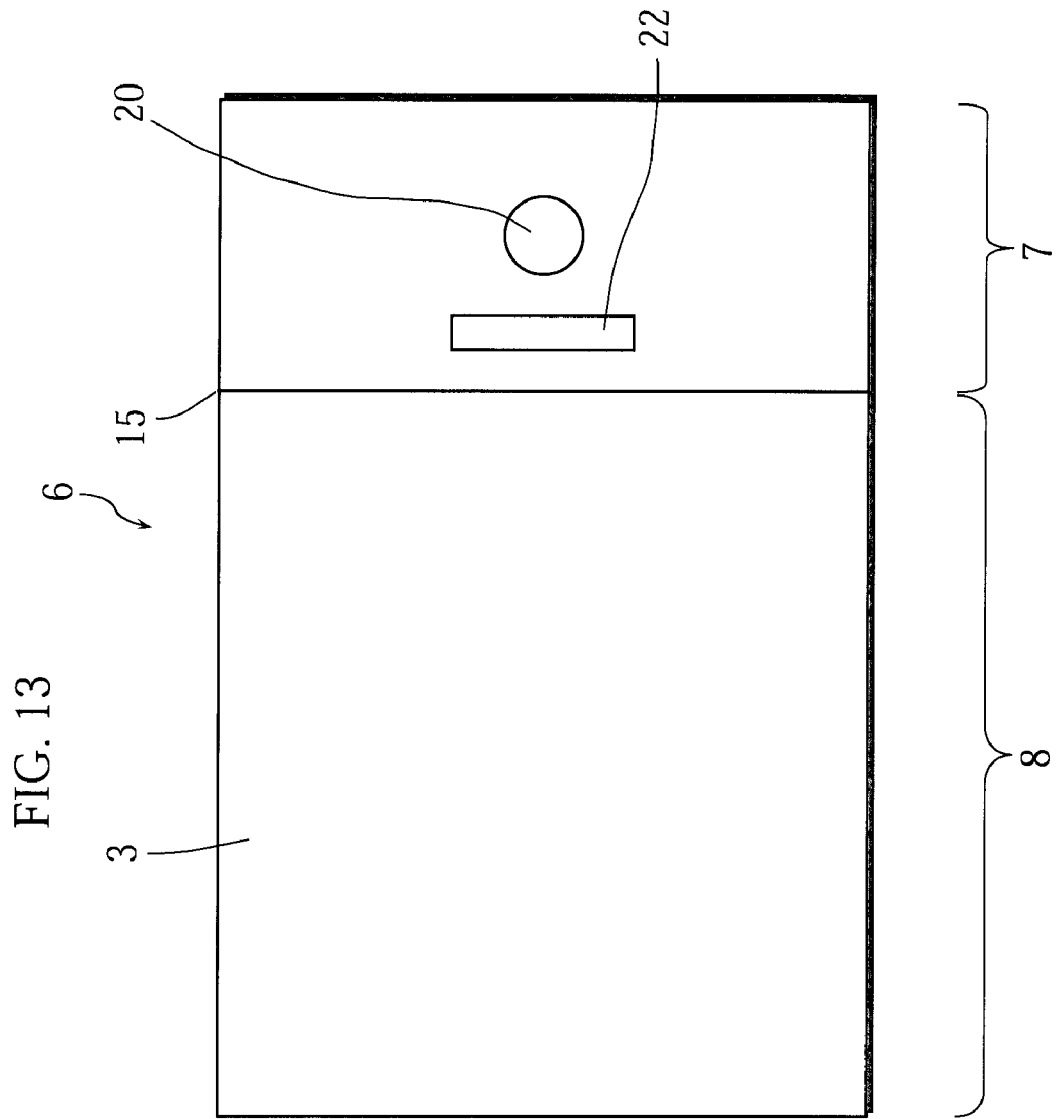
FIG. 13 is a plan view illustrating still another modified example of a capacitor element used in the second embodiment.
Figure 14:
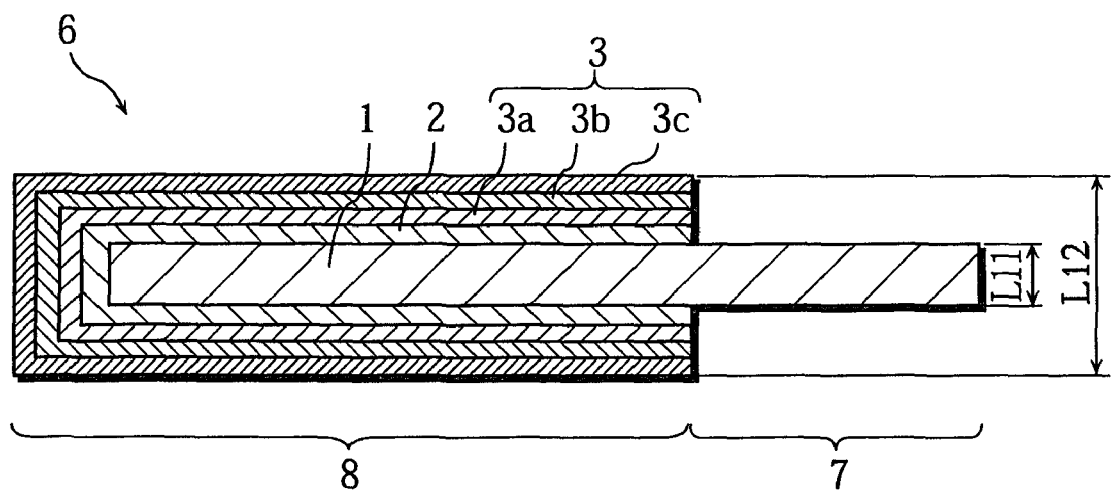
FIG. 14 is a cross-sectional view of a conventional capacitor element.
Figure 15:
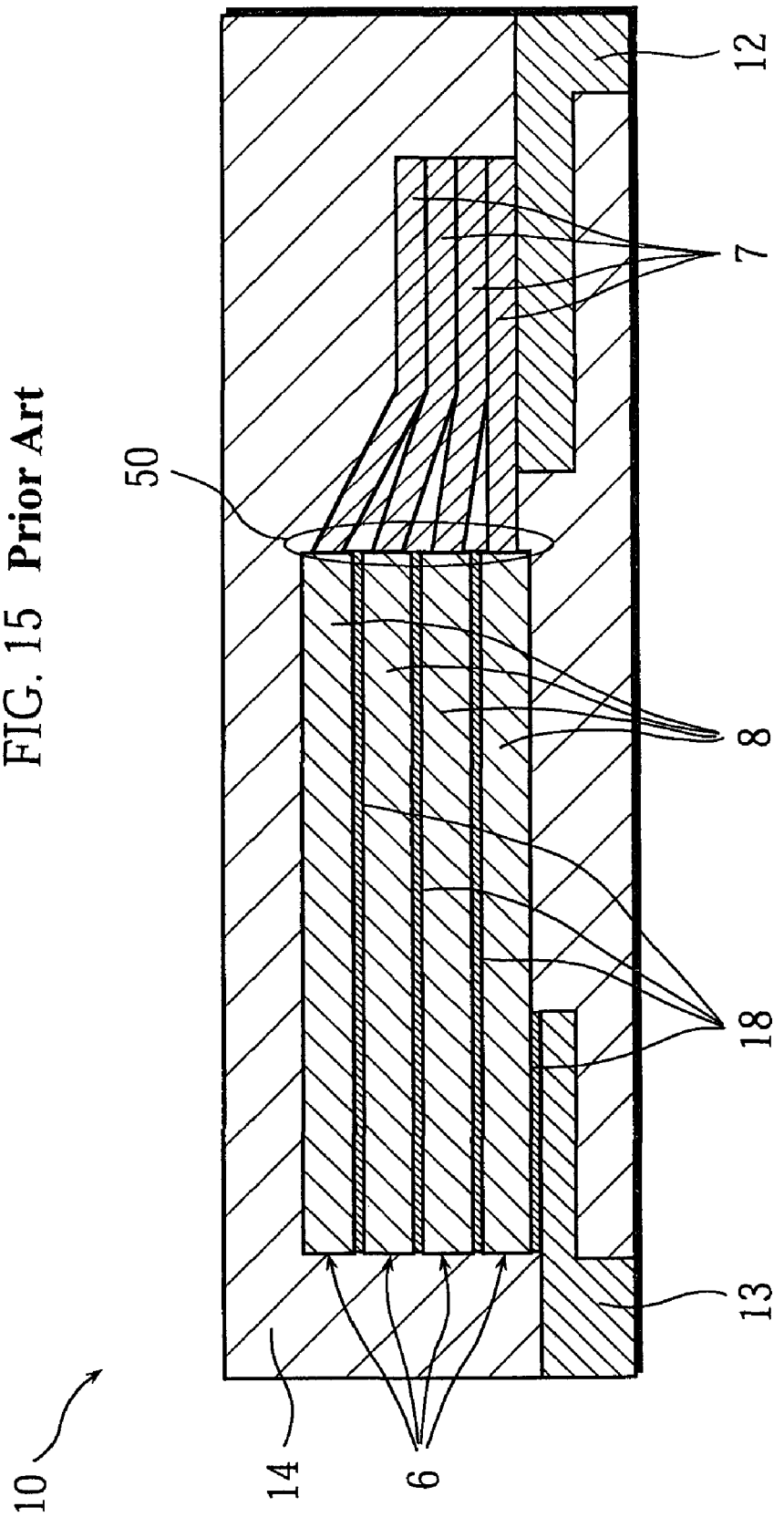
FIG. 15 is a vertical cross-sectional view of a conventional multi-layered solid electrolytic capacitor.

1: aluminum foil
2: dielectric oxide film
3: cathode layer
3a: solid electrolyte layer 3b: carbon layer
3c: silver paint layer
6: capacitor element
7: anode portion
8: cathode portion
10: multi-layered solid electrolytic capacitor
16: first stress alleviating groove
17: second stress alleviating groove
22: stress alleviating hole

The invention claimed is:

1. A multi-layered solid electrolytic capacitor comprising: a plurality of capacitor elements, each comprising an anode body having an anode portion and a cathode portion having a dielectric oxide film and a cathode layer formed in succession on a surface of the anode body, wherein the plurality of capacitor elements are stacked on top of one another, the anode portions of adjacent capacitor elements are welded each other, and the anode portion of one of the outermost capacitor elements is weld-secured to an anode terminal, the multi-layered solid electrolytic capacitor being characterized in that:
a stress alleviating groove and/or a stress alleviating hole is/are formed in between a welded part and the boundary between the anode and cathode portions in at least one of weld surfaces of the anode portion, and
the stress alleviating groove or the stress alleviating hole is so formed that the more distant the anode portion is from the anode terminal, the greater the area of the stress alleviating groove or the stress alleviating hole in the weld surface.

2. The multi-layered solid electrolytic capacitor according to claim 1, wherein the stress alleviating hole forms an oblong shape.

3. The multi-layered solid electrolytic capacitor according to claim 1, wherein the major axis of the stress alleviating groove or the stress alleviating hole is substantially parallel to the boundary between the anode and cathode portions.

4. A multi-layered solid electrolytic capacitor comprising: a plurality of capacitor elements, each comprising an anode body having an anode portion and a cathode portion having a dielectric oxide film and a cathode layer formed in succession on a surface of the anode body, wherein the plurality of capacitor elements are stacked on top of one another, the anode portions of adjacent capacitor elements are welded each other, and the anode portion of one of the outermost capacitor elements is weld-secured to an anode terminal, the multi-layered solid electrolytic capacitor being characterized in that:
a stress alleviating groove and/or a stress alleviating hole is/are formed in between a welded part and the boundary between the anode and cathode portions in at least one of weld surfaces of the anode portion, and
the multi-layered solid electrolytic capacitor comprises a plurality of capacitor elements in which a plurality of the stress alleviating grooves or a plurality of the stress alleviating holes is formed, and
the stress alleviating grooves or the stress alleviating holes are so formed that the more distant the anode portion is from the anode terminal, the greater the number of the stress alleviating grooves or the stress alleviating holes.

5. The multi-layered solid electrolytic capacitor according to claim 4, wherein the stress alleviating hole forms an oblong shape.

6. The multi-layered solid electrolytic capacitor according to claim 4, wherein the major axis of the stress alleviating groove or the stress alleviating hole is substantially parallel to the boundary between the anode and cathode portions.

7. A multi-layered solid electrolytic capacitor, comprising: a plurality of capacitor elements, each comprising an anode body having an anode portion, and a cathode portion having a dielectric oxide film and a cathode layer formed in succession on a surface of the anode body,
wherein the plurality of capacitor elements are stacked on top of one another, the anode portions of adjacent capacitor elements are welded each other, and the anode portion of one of the outermost capacitor elements is weld-secured to an anode terminal,
the multi-layered solid electrolytic capacitor being characterized in that:
in between a welded part and the boundary between the anode and cathode portions in the anode portion are formed a first bending portion and a second bending portion positioned between the first bending portion and the welded part,
a plurality of stress alleviating grooves substantially parallel to the boundary between the anode and cathode portions are formed on an anode terminal-side surface in the first bending portion,
the first bending portion has been bent toward the stress alleviating groove side, and
the second bending portion has been bent toward the side reverse to the side toward which the first bending portion has been bent,
wherein the multi-layered solid electrolytic capacitor further comprises a stress alleviating hole in addition to the stress alleviating grooves, and the stress alleviating grooves are provided so as to be joined to the stress alleviating hole.

8. A method of manufacturing a multi-layered solid electrolytic capacitor, comprising:
a first step of preparing capacitor elements each comprising an anode portion and a cathode portion in which a dielectric oxide film and a cathode layer are formed successively over a surface of an anode body;
a second step of forming a stress alleviating groove and/or a stress alleviating hole in at least one weld surface of the anode portion after the first step;
a third step of weld-securing an anode terminal to the anode portion of one of the capacitor elements after the second step; and
a fourth step of, in a state where another capacitor element is stacked on the one of the capacitor element weld-secured to the anode terminal, bending anode portions of capacitor elements in the stress alleviating groove and/or in the vicinity of the stress alleviating hole to weld-secure the anode portions of the adjacent capacitor elements to each other after the third step.

9. The method of manufacturing a multi-layered solid electrolytic capacitor according to claim 8, wherein, in the second step, the stress alleviating groove and/or the stress alleviating hole is/are formed by a laser application method.

10. The method of manufacturing a multi-layered solid electrolytic capacitor according to claim 9, wherein, in the second step, the stress alleviating hole is formed in a weld surface of the anode portion and the stress alleviating groove is formed in at least one weld surface of the anode portion so as to be joined to the stress alleviating hole.

11. The method of manufacturing a multi-layered solid electrolytic capacitor according to claim 8, wherein, in the second step, the stress alleviating hole is formed in a weld surface of the anode portion and the stress alleviating groove is formed in at least one weld surface of the anode portion so as to be joined to the stress alleviating hole.

* * * * *